(12) United States Patent
Gelmini (10) Patent No.: US 8,937,397 B2
(45) Date of Patent: Jan. 20, 2015

(54) WIND POWER TURBINE AND METHOD OF REMOVING A BEARING FROM A WIND POWER TURBINE

(75) Inventor: Emmanuele Gelmini, Trento (IT)

(73) Assignee: Wilic S.A.R.L., Luxembourg (LU)

( * ) Notice: Subject to any disclaimer, the term of this patent is extended or adjusted under 35 U.S.C. 154(b) by 169 days.

(21) Appl. No.: 13/075,400

(22) Filed: Mar. 30, 2011

(65) Prior Publication Data

US 2012/0112463 A1  May 10, 2012

(30) Foreign Application Priority Data

Mar. 30, 2010  (IT) .............................. MI2010A0531

(51) Int. Cl.
| | | |
|---|---|---|
| F03D 9/00 | (2006.01) | |
| H02P 9/04 | (2006.01) | |
| F03D 1/00 | (2006.01) | |
| F03D 11/00 | (2006.01) | |

(52) U.S. Cl.
CPC ............ *F03D 1/003* (2013.01); *F03D 11/0008* (2013.01); *Y02E 10/726* (2013.01); *Y02E 10/722* (2013.01)
USPC ............................................. 290/55; 290/44

(58) Field of Classification Search
CPC .............................. F03D 11/0008; F03D 1/003
USPC ....... 416/170 R, 174, 244 A, 244 R; 384/559, 384/584, 585, 618, 619, 620; 290/44, 55
See application file for complete search history.

(56) References Cited

U.S. PATENT DOCUMENTS

| | | |
|---|---|---|
| 1,894,357 A | 1/1933 | Manikowske et al. |
| 1,948,854 A | 2/1934 | Heath |
| 1,979,813 A | 11/1934 | Reis |
| 2,006,172 A | 6/1935 | Klappauf |
| 2,040,218 A | 5/1936 | Soderberg |
| 2,177,801 A | 10/1939 | Erren |
| 2,469,734 A | 5/1949 | Ledwith |
| 2,496,897 A | 2/1950 | Strickland |
| 2,655,611 A | 10/1953 | Sherman |
| 2,739,253 A | 3/1956 | Plumb |

(Continued)

FOREIGN PATENT DOCUMENTS

| | | |
|---|---|---|
| CA | 2404939 | 4/2004 |
| CA | 2518742 | 9/2004 |

(Continued)

OTHER PUBLICATIONS

Maxime R. Dubous, Henk Polinder, Study of TFPM Machines with Toothed Rotor Applied to Direct-Drive Generators for Wind Turbines, 2004.

(Continued)

*Primary Examiner* — Tulsidas C Patel
*Assistant Examiner* — Thomas Quigley
(74) *Attorney, Agent, or Firm* — Neal, Gerber & Eisenberg LLP (57) ABSTRACT

An electric energy producing wind power turbine having a nacelle, an electric generator having a stator and a rotor, a rotary assembly connected to the nacelle to rotate about an axis of rotation, and a bearing located between the rotary assembly and the nacelle, the nacelle having a first sector, which is located at the bearing, which is removable from the nacelle, and which is configured to form, when removed, an opening in the nacelle to allow passage of the bearing.

18 Claims, 5 Drawing Sheets

(56) References Cited

U.S. PATENT DOCUMENTS

| | | |
|---|---|---|
| 2,806,160 A | 9/1957 | Brainard |
| 2,842,214 A | 7/1958 | Prewitt |
| 2,903,610 A | 9/1959 | Bessiere |
| 3,004,782 A | 10/1961 | Meermans |
| 3,072,813 A | 1/1963 | Reijnst et al. |
| 3,083,311 A | 3/1963 | Krasnow |
| 3,131,942 A | 5/1964 | Ertaud |
| 3,168,686 A | 2/1965 | King et al. |
| 3,221,195 A | 11/1965 | Hoffmann |
| 3,363,910 A | 1/1968 | Toronchuk |
| 3,364,523 A | 1/1968 | Schippers |
| 3,392,910 A | 7/1968 | Tanzberger |
| 3,468,548 A | 9/1969 | Webb |
| 3,700,247 A | 10/1972 | Butler et al. |
| 3,724,861 A | 4/1973 | Lesiecki |
| 3,746,349 A | 7/1973 | Smale et al. |
| 3,748,089 A | 7/1973 | Boyer et al. |
| 3,789,252 A | 1/1974 | Abegg |
| 3,841,643 A | 10/1974 | McLean |
| 3,860,843 A | 1/1975 | Kawasaki et al. |
| 3,942,026 A | 3/1976 | Carter |
| 3,963,247 A | 6/1976 | Nommensen |
| 3,968,969 A | 7/1976 | Mayer et al. |
| 4,022,479 A | 5/1977 | Orlowski |
| 4,061,926 A | 12/1977 | Peed |
| 4,087,698 A | 5/1978 | Myers |
| 4,273,343 A | 6/1981 | Visser |
| 4,289,970 A | 9/1981 | Deibert |
| 4,291,235 A | 9/1981 | Bergey, Jr. et al. |
| 4,292,532 A | 9/1981 | Leroux |
| 4,336,649 A | 6/1982 | Glaser |
| 4,339,874 A | 7/1982 | Mc'Carty et al. |
| 4,348,604 A | 9/1982 | Thode |
| 4,350,897 A | 9/1982 | Benoit |
| 4,354,126 A | 10/1982 | Yates |
| 4,368,895 A | 1/1983 | Okamoto et al. |
| 4,398,773 A | 8/1983 | Boden et al. |
| 4,452,046 A | 6/1984 | Valentin |
| 4,482,831 A | 11/1984 | Notaras et al. |
| 4,490,093 A | 12/1984 | Chertok et al. |
| 4,517,483 A | 5/1985 | Hucker et al. |
| 4,517,484 A | 5/1985 | Dacier |
| 4,521,026 A | 6/1985 | Eide |
| 4,585,950 A | 4/1986 | Lund |
| 4,613,779 A | 9/1986 | Meyer |
| 4,638,200 A | 1/1987 | Le Corre et al. |
| 4,648,801 A | 3/1987 | Wilson |
| 4,694,654 A | 9/1987 | Kawamura |
| 4,700,096 A | 10/1987 | Epars |
| 4,714,852 A | 12/1987 | Kawada et al. |
| 4,720,640 A | 1/1988 | Anderson et al. |
| 4,722,661 A | 2/1988 | Mizuno |
| 4,724,348 A | 2/1988 | Stokes |
| 4,761,590 A | 8/1988 | Kaszman |
| 4,792,712 A | 12/1988 | Stokes |
| 4,801,244 A | 1/1989 | Stahl |
| 4,866,321 A | 9/1989 | Blanchard et al. |
| 4,900,965 A | 2/1990 | Fisher |
| 4,906,060 A | 3/1990 | Claude |
| 4,973,868 A | 11/1990 | Wust |
| 4,976,587 A | 12/1990 | Johnston et al. |
| 5,004,944 A | 4/1991 | Fisher |
| 5,063,318 A | 11/1991 | Anderson |
| 5,090,711 A | 2/1992 | Becker |
| 5,091,668 A | 2/1992 | Cuenot et al. |
| 5,177,388 A | 1/1993 | Hotta et al. |
| 5,191,255 A | 3/1993 | Kloosterhouse et al. |
| 5,275,139 A | 1/1994 | Rosenquist |
| 5,280,209 A | 1/1994 | Leupold et al. |
| 5,281,094 A | 1/1994 | McCarty et al. |
| 5,298,827 A | 3/1994 | Sugiyama |
| 5,302,876 A | 4/1994 | Iwamatsu et al. |
| 5,311,092 A | 5/1994 | Fisher |
| 5,315,159 A | 5/1994 | Gribnau |
| 5,331,238 A | 7/1994 | Johnsen |
| 5,410,997 A | 5/1995 | Rosenquist |
| 5,419,683 A | 5/1995 | Peace |
| 5,456,579 A | 10/1995 | Olson |
| 5,483,116 A | 1/1996 | Kusase et al. |
| 5,506,453 A | 4/1996 | McCombs |
| 5,579,800 A | 12/1996 | Walker |
| 5,609,184 A | 3/1997 | Apel et al. |
| 5,663,600 A | 9/1997 | Baek et al. |
| 5,670,838 A | 9/1997 | Everton |
| 5,696,419 A | 12/1997 | Rakestraw et al. |
| 5,704,567 A | 1/1998 | Maglieri |
| 5,746,576 A | 5/1998 | Bayly |
| 5,777,952 A | 7/1998 | Nishimura et al. |
| 5,783,894 A | 7/1998 | Wither |
| 5,793,144 A | 8/1998 | Kusase et al. |
| 5,798,632 A | 8/1998 | Muljadi |
| 5,801,470 A | 9/1998 | Johnson et al. |
| 5,811,908 A | 9/1998 | Iwata et al. |
| 5,814,914 A | 9/1998 | Caamaño |
| 5,844,333 A | 12/1998 | Sheerin |
| 5,844,341 A | 12/1998 | Spooner et al. |
| 5,857,762 A | 1/1999 | Schwaller |
| 5,886,441 A | 3/1999 | Uchida et al. |
| 5,889,346 A | 3/1999 | Uchida et al. |
| 5,894,183 A | 4/1999 | Borchert |
| 5,925,964 A | 7/1999 | Kusase et al. |
| 5,952,755 A | 9/1999 | Lubas |
| 5,961,124 A | 10/1999 | Muller |
| 5,973,435 A | 10/1999 | Irie et al. |
| 5,986,374 A | 11/1999 | Kawakami |
| 5,986,378 A | 11/1999 | Caamaño |
| 6,013,968 A | 1/2000 | Lechner et al. |
| 6,037,692 A | 3/2000 | Miekka et al. |
| 6,064,123 A | 5/2000 | Gislason |
| 6,067,227 A | 5/2000 | Katsui et al. |
| 6,089,536 A | 7/2000 | Watanabe et al. |
| 6,093,984 A | 7/2000 | Shiga et al. |
| 6,127,739 A | 10/2000 | Appa |
| 6,172,429 B1 | 1/2001 | Russell |
| 6,177,746 B1 | 1/2001 | Tupper et al. |
| 6,193,211 B1 | 2/2001 | Watanabe et al. |
| 6,194,799 B1 | 2/2001 | Miekka et al. |
| 6,215,199 B1 | 4/2001 | Lysenko et al. |
| 6,232,673 B1 | 5/2001 | Schoo et al. |
| 6,278,197 B1 | 8/2001 | Appa |
| 6,285,090 B1 | 9/2001 | Brutsaert et al. |
| 6,326,711 B1 | 12/2001 | Yamaguchi et al. |
| 6,365,994 B1 | 4/2002 | Watanabe et al. |
| 6,373,160 B1 | 4/2002 | Schrödl |
| 6,376,956 B1 | 4/2002 | Hosoya |
| 6,378,839 B2 | 4/2002 | Watanabe et al. |
| 6,384,504 B1 | 5/2002 | Elrhart et al. |
| 6,417,578 B1 | 7/2002 | Chapman et al. |
| 6,428,011 B1 | 8/2002 | Oskouei |
| 6,452,287 B1 | 9/2002 | Looker |
| 6,452,301 B1 | 9/2002 | Van Dine et al. |
| 6,455,976 B1 | 9/2002 | Nakano |
| 6,472,784 B2 | 10/2002 | Miekka et al. |
| 6,474,653 B1 | 11/2002 | Hintenlang et al. |
| 6,476,513 B1 | 11/2002 | Gueorguiev |
| 6,483,199 B2 | 11/2002 | Umemoto et al. |
| 6,492,743 B1 | 12/2002 | Appa |
| 6,492,754 B1 | 12/2002 | Weiglhofer et al. |
| 6,499,532 B1 | 12/2002 | Williams |
| 6,504,260 B1 | 1/2003 | Debleser |
| 6,515,390 B1 | 2/2003 | Lopatinsky et al. |
| 6,520,737 B1 | 2/2003 | Fischer et al. |
| 6,548,932 B1 | 4/2003 | Weiglhofer et al. |
| 6,590,312 B1 | 7/2003 | Seguchi et al. |
| 6,603,232 B2 | 8/2003 | Van Dine et al. |
| 6,617,747 B1 | 9/2003 | Petersen |
| 6,629,358 B2 | 10/2003 | Setiabudi et al. |
| 6,664,692 B1 | 12/2003 | Kristoffersen |
| 6,676,122 B1 | 1/2004 | Wobben |
| 6,683,397 B2 | 1/2004 | Gauthier et al. |
| 6,700,260 B2 | 3/2004 | Hsu et al. |
| 6,700,288 B2 | 3/2004 | Smith |
| 6,707,224 B1 | 3/2004 | Petersen |
| 6,720,688 B1 | 4/2004 | Schiller |

(56) References Cited

U.S. PATENT DOCUMENTS

| | | |
|---|---|---|
| 6,727,624 B2 | 4/2004 | Morita et al. |
| 6,746,217 B2 | 6/2004 | Kim et al. |
| 6,759,758 B2 | 7/2004 | Martinez |
| 6,762,525 B1 | 7/2004 | Maslov et al. |
| 6,781,276 B1 | 8/2004 | Stiesdal et al. |
| 6,784,564 B1 | 8/2004 | Wobben |
| 6,794,781 B2 | 9/2004 | Razzell et al. |
| 6,828,710 B1 | 12/2004 | Gabrys |
| 6,856,042 B1 | 2/2005 | Kubota |
| 6,879,075 B2 | 4/2005 | Calfo et al. |
| 6,888,262 B2 | 5/2005 | Blakemore |
| 6,891,299 B2 | 5/2005 | Coupart et al. |
| 6,903,466 B1 | 6/2005 | Mercier et al. |
| 6,903,475 B2 | 6/2005 | Ortt et al. |
| 6,906,444 B2 | 6/2005 | Hattori et al. |
| 6,911,741 B2 | 6/2005 | Petteersen et al. |
| 6,921,243 B2 | 7/2005 | Canini et al. |
| 6,931,834 B2 | 8/2005 | Jones |
| 6,933,645 B1 | 8/2005 | Watson |
| 6,933,646 B2 | 8/2005 | Kinoshita |
| 6,942,454 B2 | 9/2005 | Ohlmann |
| 6,945,747 B1 | 9/2005 | Miller |
| 6,949,860 B2 | 9/2005 | Hama et al. |
| 6,951,443 B1 | 10/2005 | Blakemore |
| 6,972,498 B2 | 12/2005 | Jamieson et al. |
| 6,983,529 B2 | 1/2006 | Ortt et al. |
| 6,984,908 B2 | 1/2006 | Rinholm et al. |
| 6,987,342 B2 | 1/2006 | Hans |
| 6,998,729 B1 | 2/2006 | Wobben |
| 7,004,724 B2 | 2/2006 | Pierce et al. |
| 7,008,172 B2 | 3/2006 | Selsam |
| 7,008,348 B2 | 3/2006 | LaBath |
| 7,016,006 B2 | 3/2006 | Song |
| 7,021,905 B2 | 4/2006 | Torrey et al. |
| 7,028,386 B2 | 4/2006 | Kato et al. |
| 7,033,139 B2 | 4/2006 | Wobben |
| 7,038,343 B2 | 5/2006 | Agnes et al. |
| 7,042,109 B2 | 5/2006 | Gabrys |
| 7,057,305 B2 | 6/2006 | Krüger-Gotzmann et al. |
| 7,075,192 B2 | 7/2006 | Bywaters et al. |
| 7,081,696 B2 | 7/2006 | Ritchey |
| 7,088,024 B2 | 8/2006 | Agnes et al. |
| 7,091,642 B2 | 8/2006 | Agnes et al. |
| 7,095,128 B2 | 8/2006 | Canini et al. |
| 7,098,552 B2 | 8/2006 | McCoin |
| 7,109,600 B1 | 9/2006 | Bywaters et al. |
| 7,111,668 B2 | 9/2006 | Rürup |
| 7,116,006 B2 | 10/2006 | McCoin |
| 7,119,469 B2 | 10/2006 | Ortt et al. |
| 7,154,191 B2 | 12/2006 | Jansen et al. |
| 7,161,260 B2 | 1/2007 | Krügen-Gotzmann et al. |
| 7,166,942 B2 | 1/2007 | Yokota |
| 7,168,248 B2 | 1/2007 | Sakamoto et al. |
| 7,168,251 B1 | 1/2007 | Janssen |
| 7,179,056 B2 | 2/2007 | Sieffriedsen |
| 7,180,204 B2 | 2/2007 | Grant et al. |
| 7,183,665 B2 | 2/2007 | Bywaters et al. |
| 7,196,446 B2 | 3/2007 | Hans |
| 7,205,678 B2 | 4/2007 | Casazza et al. |
| 7,217,091 B2 | 5/2007 | LeMieux |
| 7,259,472 B2 | 8/2007 | Miyake et al. |
| 7,281,501 B2 | 10/2007 | Leufen et al. |
| 7,285,890 B2 | 10/2007 | Jones et al. |
| 7,323,792 B2 | 1/2008 | Sohn |
| 7,345,376 B2 | 3/2008 | Costin |
| 7,358,637 B2 | 4/2008 | Tapper |
| 7,377,163 B2 | 5/2008 | Miyagawa |
| 7,385,305 B2 | 6/2008 | Casazza et al. |
| 7,385,306 B2 | 6/2008 | Casazza et al. |
| 7,392,988 B2 | 7/2008 | Moldt et al. |
| 7,427,814 B2 | 9/2008 | Bagepalli et al. |
| 7,431,567 B1 | 10/2008 | Bevington et al. |
| 7,443,066 B2 | 10/2008 | Salamah et al. |
| 7,458,261 B2 | 12/2008 | Miyagawa |
| 7,482,720 B2 | 1/2009 | Gordon et al. |
| 7,548,008 B2 | 6/2009 | Jansen et al. |
| 7,550,863 B2 | 6/2009 | Versteegh |
| 7,594,800 B2 | 9/2009 | Teipen |
| 7,687,932 B2 | 3/2010 | Casazza et al. |
| 2002/0047418 A1 | 4/2002 | Seguchi et al. |
| 2002/0047425 A1 | 4/2002 | Coupart et al. |
| 2002/0056822 A1 | 5/2002 | Watanabe et al. |
| 2002/0063485 A1 | 5/2002 | Lee et al. |
| 2002/0089251 A1 | 7/2002 | Tajima et al. |
| 2002/0148453 A1 | 10/2002 | Watanabe et al. |
| 2003/0011266 A1 | 1/2003 | Morita et al. |
| 2003/0102677 A1 | 6/2003 | Becker et al. |
| 2003/0137149 A1 | 7/2003 | Northrup et al. |
| 2003/0230899 A1 | 12/2003 | Martinez |
| 2004/0066098 A1 | 4/2004 | Doherty et al. |
| 2004/0086373 A1 | 5/2004 | Page, Jr. |
| 2004/0094965 A1 | 5/2004 | Kirkegaard et al. |
| 2004/0119292 A1 | 6/2004 | Datta et al. |
| 2004/0150283 A1 | 8/2004 | Calfo et al. |
| 2004/0151575 A1 | 8/2004 | Pierce et al. |
| 2004/0151577 A1 | 8/2004 | Pierce et al. |
| 2004/0189136 A1 | 9/2004 | Kolomeitsev et al. |
| 2005/0002783 A1 | 1/2005 | Hiel et al. |
| 2005/0002787 A1 | 1/2005 | Wobben |
| 2005/0082836 A1 | 4/2005 | Lagerwey |
| 2005/0082839 A1 | 4/2005 | McCoin |
| 2005/0230979 A1 | 10/2005 | Bywaters et al. |
| 2005/0280264 A1 | 12/2005 | Nagy |
| 2006/0000269 A1 | 1/2006 | LeMieux et al. |
| 2006/0001269 A1 | 1/2006 | Jansen et al. |
| 2006/0006658 A1 | 1/2006 | McCoin |
| 2006/0012182 A1 | 1/2006 | McCoin |
| 2006/0028025 A1 | 2/2006 | Kikuchi et al. |
| 2006/0066110 A1 | 3/2006 | Jansen et al. |
| 2006/0071575 A1 | 4/2006 | Jansen et al. |
| 2006/0091735 A1 | 5/2006 | Song et al. |
| 2006/0125243 A1 | 6/2006 | Miller |
| 2006/0131985 A1 | 6/2006 | Qu et al. |
| 2006/0152012 A1 | 7/2006 | Wiegel et al. |
| 2006/0152015 A1 | 7/2006 | Bywaters et al. |
| 2006/0152016 A1 | 7/2006 | Bywaters et al. |
| 2007/0020109 A1 | 1/2007 | Takahashi et al. |
| 2007/0116567 A1 | 5/2007 | Luetze |
| 2007/0187954 A1 | 8/2007 | Struve et al. |
| 2007/0187956 A1 | 8/2007 | Wobben |
| 2007/0222223 A1 | 9/2007 | Bagepalli et al. |
| 2007/0222226 A1 | 9/2007 | Casazza et al. |
| 2007/0222227 A1 | 9/2007 | Casazza et al. |
| 2008/0003105 A1 | 1/2008 | Nies |
| 2008/0025847 A1 | 1/2008 | Teipen |
| 2008/0050234 A1 | 2/2008 | Ingersoll et al. |
| 2008/0107526 A1 | 5/2008 | Wobben |
| 2008/0118342 A1 | 5/2008 | Seidel et al. |
| 2008/0197636 A1 | 8/2008 | Tilscher et al. |
| 2008/0197638 A1 | 8/2008 | Wobben |
| 2008/0199309 A1 * | 8/2008 | Bagepalli et al. .......... 415/170.1 |
| 2008/0246224 A1 | 10/2008 | Pabst et al. |
| 2008/0290664 A1 | 11/2008 | Kruger |
| 2008/0303281 A1 | 12/2008 | Krueger |
| 2008/0309189 A1 | 12/2008 | Pabst et al. |
| 2008/0315594 A1 | 12/2008 | Casazza et al. |
| 2009/0045628 A1 | 2/2009 | Erdman et al. |
| 2009/0060748 A1 | 3/2009 | Landa et al. |
| 2009/0094981 A1 | 4/2009 | Eggleston |
| 2009/0096309 A1 | 4/2009 | Pabst et al. |
| 2009/0302702 A1 | 12/2009 | Pabst et al. |
| 2010/0019502 A1 | 1/2010 | Pabst et al. |
| 2010/0026010 A1 | 2/2010 | Pabst |
| 2010/0117362 A1 | 5/2010 | Vihriala et al. |
| 2010/0123318 A1 | 5/2010 | Casazza et al. |

FOREIGN PATENT DOCUMENTS

| | | |
|---|---|---|
| CN | 1554867 | 12/2004 |
| DE | 1130913 | 6/1962 |
| DE | 2164135 | 7/1973 |
| DE | 2322458 | 11/1974 |
| DE | 2506160 | 8/1976 |
| DE | 2922885 | 12/1980 |

(56) References Cited

FOREIGN PATENT DOCUMENTS

| | | |
|---|---|---|
| DE | 3638129 | 5/1988 |
| DE | 3718954 | 12/1988 |
| DE | 3844505 | 7/1990 |
| DE | 3903399 | 8/1990 |
| DE | 4304577 | 8/1994 |
| DE | 4402184 | 8/1995 |
| DE | 4415570 | 11/1995 |
| DE | 4444757 | 6/1996 |
| DE | 29706980 | 7/1997 |
| DE | 19636591 | 3/1998 |
| DE | 19644355 | 4/1998 |
| DE | 19652673 | 6/1998 |
| DE | 19711869 | 9/1998 |
| DE | 19748716 | 11/1998 |
| DE | 29819391 | 2/1999 |
| DE | 19801803 | 4/1999 |
| DE | 19932394 | 1/2001 |
| DE | 19947915 | 4/2001 |
| DE | 19951594 | 5/2001 |
| DE | 10000370 | 7/2001 |
| DE | 20102029 | 8/2001 |
| DE | 10219190 | 11/2003 |
| DE | 10246690 | 4/2004 |
| DE | 102004018524 | 11/2005 |
| DE | 102004028746 | 12/2005 |
| DE | 102007042338 | 3/2009 |
| EP | 0013157 | 7/1980 |
| EP | 0232963 | 8/1987 |
| EP | 0313392 | 4/1989 |
| EP | 0627805 | 12/1994 |
| EP | 1108888 | 6/2001 |
| EP | 1167754 | 1/2002 |
| EP | 1289097 | 3/2003 |
| EP | 1291521 | 3/2003 |
| EP | 1309067 | 5/2003 |
| EP | 1363019 | 11/2003 |
| EP | 1365147 A2 * | 11/2003 .............. F03D 11/00 |
| EP | 1375913 | 1/2004 |
| EP | 1394406 | 3/2004 |
| EP | 1394451 | 3/2004 |
| EP | 1589222 | 10/2005 |
| EP | 1612415 | 1/2006 |
| EP | 1641102 | 3/2006 |
| EP | 1677002 | 7/2006 |
| EP | 1772624 | 4/2007 |
| EP | 1772624 A2 * | 4/2007 .............. F03D 11/00 |
| EP | 1780409 | 5/2007 |
| EP | 1829762 | 9/2007 |
| EP | 1881194 | 1/2008 |
| EP | 1921311 | 5/2008 |
| EP | 2031273 | 3/2009 |
| EP | 2060786 | 5/2009 |
| EP | 2143936 | 1/2010 |
| EP | 2148090 | 1/2010 |
| ES | 2140301 | 2/2000 |
| FR | 806292 | 12/1936 |
| FR | 859844 | 12/1940 |
| FR | 1348765 | 1/1964 |
| FR | 2401091 | 3/1979 |
| FR | 2445053 | 7/1980 |
| FR | 2519483 | 7/1983 |
| FR | 2594272 | 8/1987 |
| FR | 2760492 | 9/1998 |
| FR | 2796671 | 1/2001 |
| FR | 2798168 | 3/2001 |
| FR | 2810374 | 12/2001 |
| FR | 2882404 | 8/2006 |
| GB | 191317268 | 3/1914 |
| GB | 859176 | 1/1961 |
| GB | 1524477 | 9/1978 |
| GB | 1537729 | 1/1979 |
| GB | 2041111 | 9/1980 |
| GB | 2050525 | 1/1981 |
| GB | 2075274 | 11/1981 |
| GB | 2131630 | 6/1984 |
| GB | 2144587 | 3/1985 |
| GB | 2208243 | 3/1989 |
| GB | 2266937 | 11/1993 |
| GB | 2372783 | 9/2002 |
| JP | 57059462 | 4/1982 |
| JP | 3145945 | 6/1991 |
| JP | 5122912 | 5/1993 |
| JP | 6002970 | 1/1994 |
| JP | 6269141 | 9/1994 |
| JP | 10-070858 | 3/1998 |
| JP | 11236977 | 8/1999 |
| JP | 11-299197 | 10/1999 |
| JP | 2000-134885 | 5/2000 |
| JP | 2001-057750 | 2/2001 |
| JP | 2003453072 | 7/2003 |
| JP | 2004-153913 | 5/2004 |
| JP | 2004-297947 | 10/2004 |
| JP | 2005-006375 | 1/2005 |
| JP | 2005-020906 | 1/2005 |
| JP | 2005-312150 | 11/2005 |
| NL | 8902534 | 5/1991 |
| RU | 2000466 | 9/1993 |
| RU | 2229621 | 5/2004 |
| WO | WO8402382 | 6/1984 |
| WO | WO9105953 | 5/1991 |
| WO | WO9212343 | 7/1992 |
| WO | WO9730504 | 8/1997 |
| WO | WO9733357 | 9/1997 |
| WO | WO9840627 | 9/1998 |
| WO | WO9930031 | 6/1999 |
| WO | WO9933165 | 7/1999 |
| WO | WO9937912 | 7/1999 |
| WO | WO9939426 | 8/1999 |
| WO | WO0001056 | 1/2000 |
| WO | WO0106121 | 1/2001 |
| WO | WO0106623 | 1/2001 |
| WO | WO0107784 | 2/2001 |
| WO | WO0121956 | 3/2001 |
| WO | WO0125631 | 4/2001 |
| WO | WO0129413 | 4/2001 |
| WO | WO0134973 | 5/2001 |
| WO | WO0135517 | 5/2001 |
| WO | WO0169754 | 9/2001 |
| WO | WO0233254 | 4/2002 |
| WO | WO02057624 | 7/2002 |
| WO | WO02079644 | 10/2002 |
| WO | WO02083523 | 10/2002 |
| WO | WO03036084 | 5/2003 |
| WO | WO03067081 | 8/2003 |
| WO | WO03076801 | 9/2003 |
| WO | WO2004017497 | 2/2004 |
| WO | WO2004042227 | 5/2004 |
| WO | WO2005103489 | 11/2005 |
| WO | WO2006000214 | 1/2006 |
| WO | WO2006013722 | 2/2006 |
| WO | WO2006032515 | 3/2006 |
| WO | WO2007063370 | 6/2007 |
| WO | WO2007110718 | 10/2007 |
| WO | WO2008052562 | 5/2008 |
| WO | WO2008078342 | 7/2008 |
| WO | WO2008086608 | 7/2008 |
| WO | WO2008098573 | 8/2008 |
| WO | WO2008102184 | 8/2008 |
| WO | WO2008116463 | 10/2008 |
| WO | WO2008131766 | 11/2008 |
| WO | WO 2010063291 A2 * | 6/2010 .............. F03D 11/00 |

OTHER PUBLICATIONS

Variable Speed Gearless Wind Turbine (website), http://www.mhi.cojp/msmw/mw/en/gearless.html, viewed on Sep. 22, 2006.

Italian Search Report dated Nov. 4, 2010 for IT MI20100531.

* cited by examiner

WIND POWER TURBINE AND METHOD OF REMOVING A BEARING FROM A WIND POWER TURBINE

PRIORITY CLAIM

This application claims the benefit of and priority to Italian Patent Application No. MI2010A 000531, filed on Mar. 30, 2010, the entire contents of which are incorporated herein.

BACKGROUND

Certain known wind power turbines comprise a nacelle; a rotary assembly fitted to the nacelle to rotate about an axis of rotation; and at least one bearing or bearing assembly between the nacelle and the rotary assembly. The bearing or bearings in the bearing assembly are normally rolling bearings, which are subject to wear and must eventually be changed. Changing the bearing or bearing assembly is a complicated, painstaking job, which calls for dismantling part of the wind power turbine and invariably involves a good deal of downtime. It is also a dangerous operation, in view of the weight of the bearing and the component parts supported by it, which is directly proportional to the size of the wind power turbine.

European Patent Application No. 1,772,624 A2 describes a method of removing a bearing assembly from a wind power turbine, and which, in addition to dismantling the bearing assembly from the rotary assembly and the nacelle, also comprises manipulating the bearing assembly inside the nacelle, along and crosswise to the axis of rotation, as shown in FIG. 7 of this European Patent Application. As stated, this is a painstaking job, which is made even harder by being performed in the confined space inside the nacelle.

The same also applies to the wind power turbine described in German Patent Application No. 10 2004 028 746 A1, which calls for a similar procedure to change a single bearing.

SUMMARY

The present disclosure relates to a wind power turbine. In particular, the present disclosure relates to a wind power turbine equipped with a tubular electric generator (such as the wind power turbine as described in example U.S. Pat. No. 7,385,306 B2 and example European Patent Application No. 2,148,090 A) and which is configured to limit certain the drawbacks of the known art.

More specifically, an object of the present disclosure is to provide a wind power turbine configured to permit easy bearing removal and installation, in particular to reduce downtime.

According to one embodiment of the present disclosure, there is provided a wind power turbine for producing electric energy, the wind power turbine comprising a nacelle, an electric generator having a stator and a rotor, a rotary assembly connected to the nacelle to rotate about an axis of rotation, and a bearing located between the nacelle and the rotary assembly, wherein the nacelle comprises a first sector, which is located at the bearing, which is removable from the nacelle, and which is configured to form, when removed, an opening in the nacelle to allow passage of the bearing.

In this embodiment, the bearing can thus be extracted from the nacelle by simply moving the bearing radially with respect to the axis of rotation, and can be changed faster and more safely by reducing movement of the rotary assembly.

In one embodiment of the present disclosure, the nacelle comprises a second sector complementary to the first sector and connected to the first sector about the axis of rotation to form a bearing supporting ring. In this embodiment, the first sector is thus a bearing supporting sector and, when removed, allows direct access to the bearing from outside the nacelle.

In another embodiment of the present disclosure, the ring is connected to the rest of the nacelle by a sliding coupling that slides in a direction parallel to the axis of rotation and permits adjustments of a few millimeters to the position of the ring with respect to the rest of the nacelle.

The structure of the nacelle thus allows a small amount of movement of the bearing with respect to the other parts of the rotary assembly.

In another embodiment of the present disclosure, the rotary assembly comprises the rotor, a hub, blades extending from the hub, and a connecting member located between the hub and the rotor, at the bearing, and connected releasably to the rotor and hub.

By releasing the connecting member from the rotor and hub, the rotor therefore need not be removed from the rotary assembly, thus greatly reducing axial movement of the bearing and/or rotary assembly inside the nacelle.

Another object of the present disclosure is to provide a simple, practical method of removing the bearing.

According to one embodiment of the present disclosure, there is provided a method of removing a bearing from a wind power turbine, the wind power turbine comprising a nacelle, an electric generator having a stator and a rotor, a rotary assembly connected to the nacelle to rotate about an axis of rotation, and a bearing located between the nacelle and the rotary assembly; the nacelle comprising a first sector located at the bearing; and the method comprising the steps of removing the first sector from the nacelle to form an opening, at the bearing, large enough to allow passage of the bearing, releasing the bearing at least partly from the rotary assembly, and removing the bearing through the opening in the nacelle.

Additional features and advantages are described in, and will be apparent from, the following Detailed Description and the figures.

BRIEF DESCRIPTION OF THE DRAWINGS

A non-limiting embodiment of the present disclosure will be described by way of example with reference to the accompanying drawings, in which.

DETAILED DESCRIPTION

Figure 1:
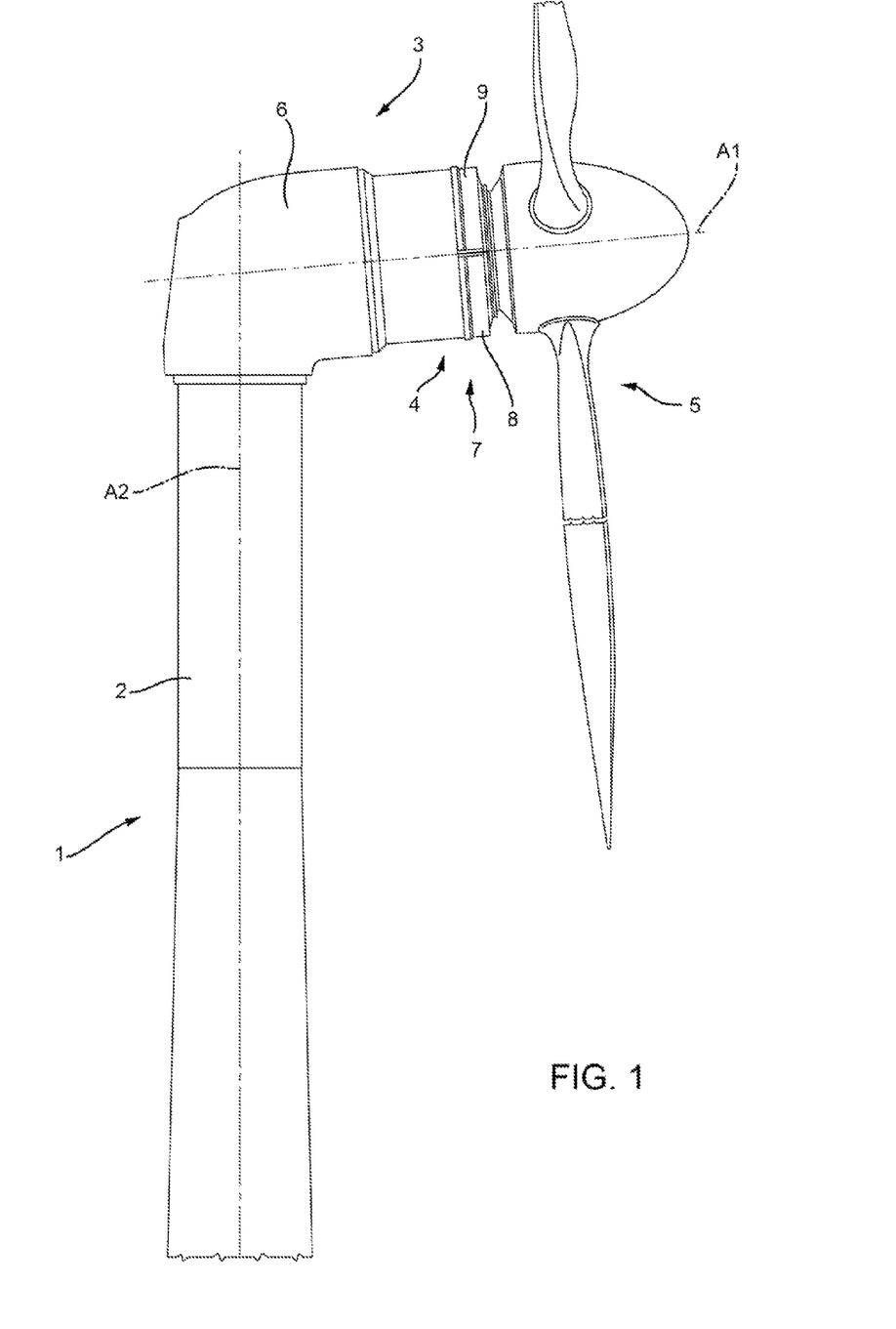
FIG. 1 shows a side view, with parts removed for clarity, of a wind power turbine in accordance with the present disclosure.

Referring now to the example embodiments of the present disclosure illustrated in FIGS. 1 to 10, number 1 in FIG. 1 indicates as a whole a wind power turbine for producing electric energy. Wind power turbine 1 comprises a vertical support 2; a nacelle 3; an electric generator 4; and a rotary assembly 5 fitted to nacelle 3 to rotate about an axis of rotation A1. Nacelle 3 in turn is fitted to vertical support 2 to rotate about an axis of rotation A2.

Nacelle 3 is substantially a tubular member for supporting rotary assembly 5, which extends partly inside and partly outside nacelle 3. In the example shown, nacelle 3 comprises a curved tubular member 6; part of electric generator 4; and a ring 7 comprising two complementary sectors 8, 9 fitted to one another about axis of rotation A1.

Figure 2:
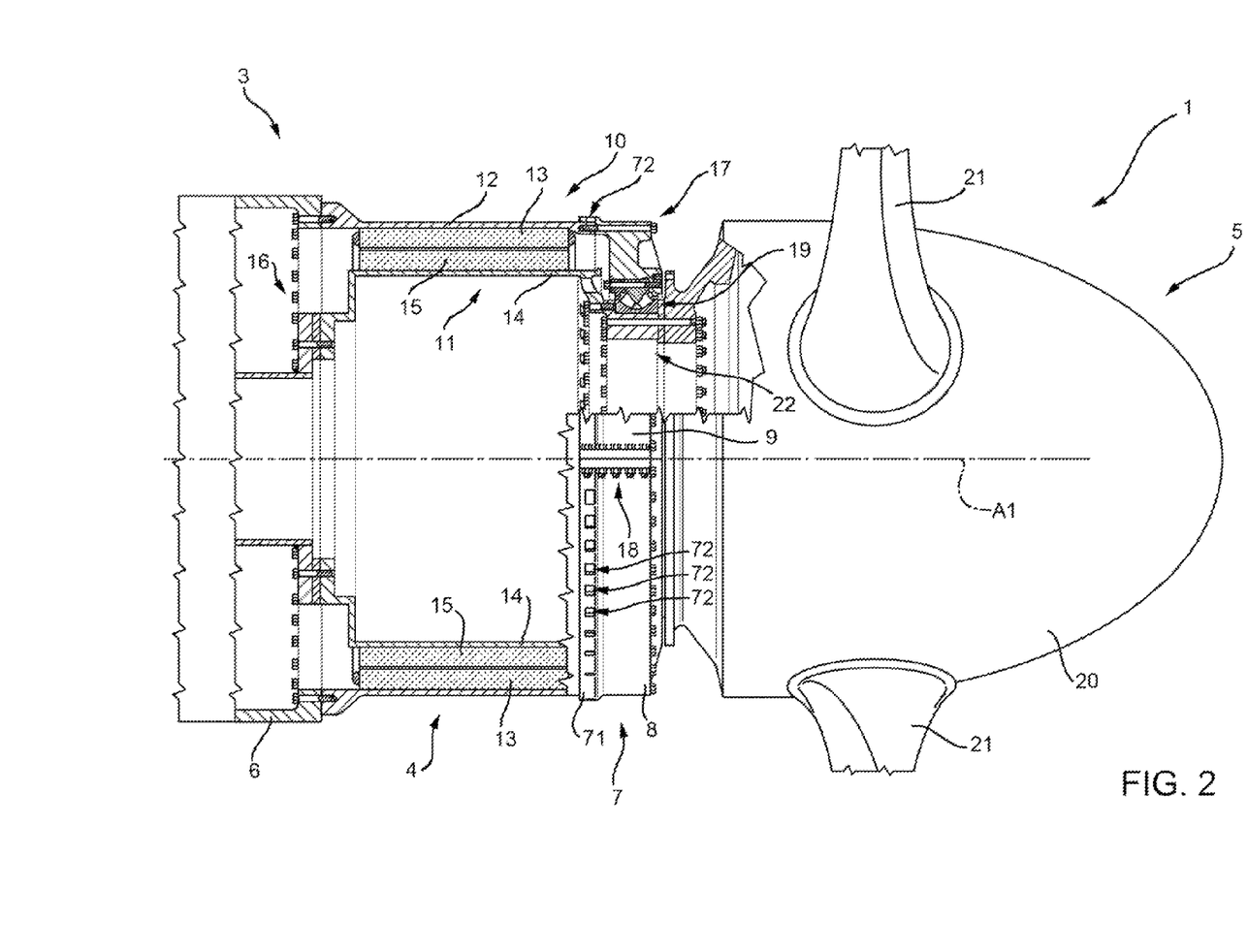
FIG. 2 shows a larger-scale, partly sectioned side view, with parts removed for clarity, the wind power turbine of FIG. 1.

With reference to FIG. 2, electric generator 4 is tubular, and comprises a stator 10 and a rotor 11. Stator 10 comprises a cylindrical wall 12, and stator segments 13 arranged about axis of rotation A1 and fixed to the inner face of cylindrical wall 12; and rotor 11 comprises a cylindrical wall 14, and rotor segments 15 arranged about axis of rotation A1 and fixed to the outer face of cylindrical wall 14.

More specifically, nacelle 3 comprises curved tubular member 6; stator 10, or rather cylindrical wall 12 of stator 10; and ring 7.

That is, cylindrical wall 12 has two opposite flanged ends fixed to curved tubular member 6 and ring 7 by respective bolted joints 16 and 17. More specifically, ring 7 is connected slidably to cylindrical wall 12, and is locked in position by bolted joint 17, which comprises fasteners, such as screws, parallel to axis of rotation A1 and connecting respective end faces of ring 7 and cylindrical wall 12. Ring 7 comprises cylindrical-wall-shaped appendixes 71 about and contacting cylindrical wall 12 to form a telescopic connection; and slots 72 formed in appendixes 71 and spaced about axis of rotation A1, close to where the end face of ring 7 contacts the end face of cylindrical wall 12.

More specifically, sectors 8 and 9 are each semicircular in shape, and are connected by two bolted joints 18 (only one shown in FIG. 2) to form ring 7. In the example shown, sector 8 is located below sector 9.

Wind power turbine 1 comprises a bearing 19 between nacelle 3 and rotary assembly 5. In the example shown, wind power turbine 1 comprises a single bearing 19 capable of withstanding axial and radial stress between nacelle 3 and rotary assembly 5. It should be appreciated that the specific configuration shown in the drawings and described herein in no way limits the protective scope of the present disclosure. For example, in different embodiments, bearing 19 is fitted to the outside of ring 7, is fixed directly to sectors 8 and 9 (as in the example shown), and/or is fixed to the inside of rotary assembly 5.

Rotary assembly 5 comprises rotor 11; a hub 20; and blades 21 fitted to hub 20. In the example shown, rotary assembly 5 also comprises a connecting member 22 located between rotor 11 and hub 20, at and substantially inside bearing 19. More specifically, bearing 19 is fixed directly to connecting member 22, which is connected directly to rotor 11. In other words, wind power turbine 1 is a direct-drive type.

Figure 3:
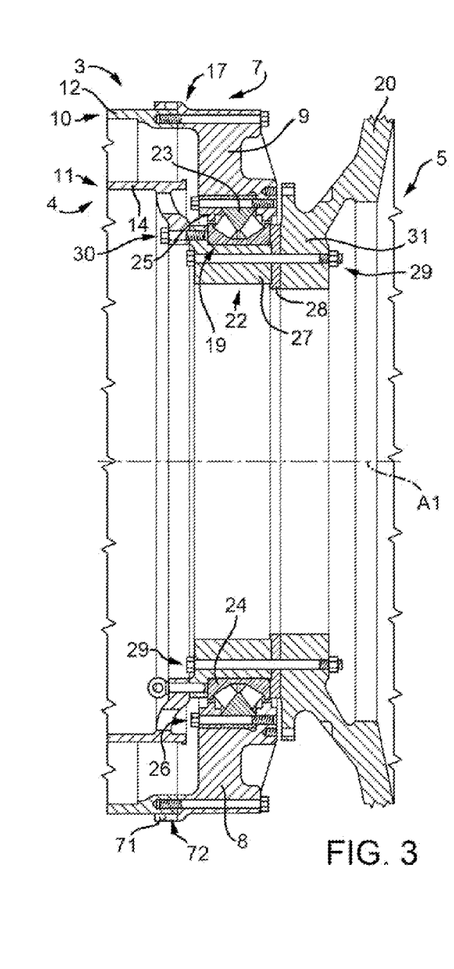
FIGS. 3, 4, 5, 6, 7, 8, 9 and 10 show sections, with parts removed for clarity, of a detail of the wind power turbine of FIG. 2, at successive stages in the bearing removal method according to the present disclosure.

With reference to FIG. 3, bearing 19 is a rolling-contact bearing—in the example shown, with inclined tapered rollers—and comprises an outer race 23, an inner race 24, and two rings of tapered rollers. The outer race 23 is fitted to nacelle 3—in the example shown, to ring 7. More specifically, outer race 23 is fixed to ring 7 by a flange 25 and a bolted joint 26, which connects flange 25, outer race 23, and ring 7. Flange 25 and an appendix of ring 7 define two opposite shoulders, each for a respective ring of tapered rollers.

The inner race 24 is fixed to connecting member 22, which comprises a ring 27, and a flange 28 connected to ring 27 and hub 20 by a bolted joint 29. In other words, inner race 24 is gripped axially—with reference to axis of rotation A1—between flange 28 and a shoulder formed on ring 27.

Rotor 11 is also fixed to connecting member 22 by a bolted joint 30.

Hub 20 comprises a flange 31 partly facing connecting member 22 and ring 7, and which connects hub 20 to connecting member 22 and ring 7.

Figure 4:
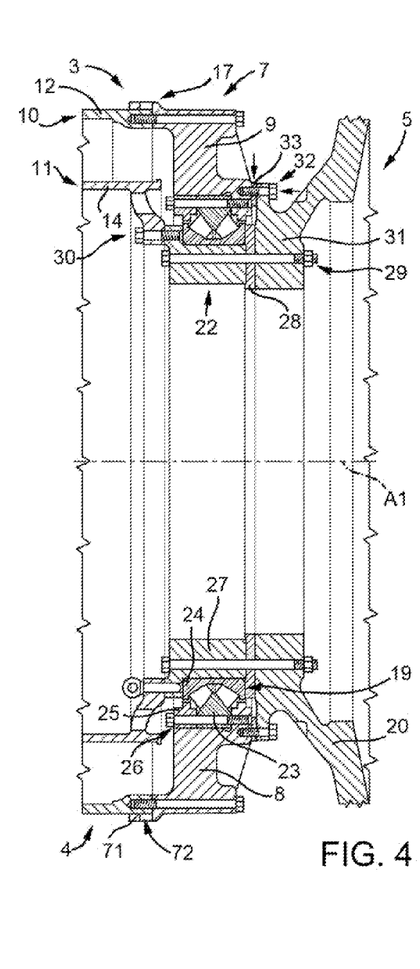

Flange 31 is connected to connecting member 22 by bolted joint 29, and is connected to ring 7 by a bolted joint 32 and by shims 33 inserted inside a gap between the facing portions of ring 7 and flange 31, as shown in FIG. 4.

Figure 5:
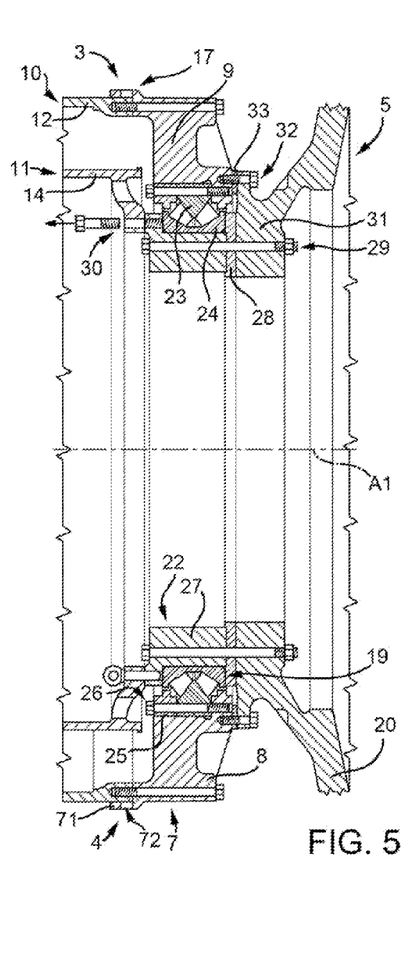
Figure 6:
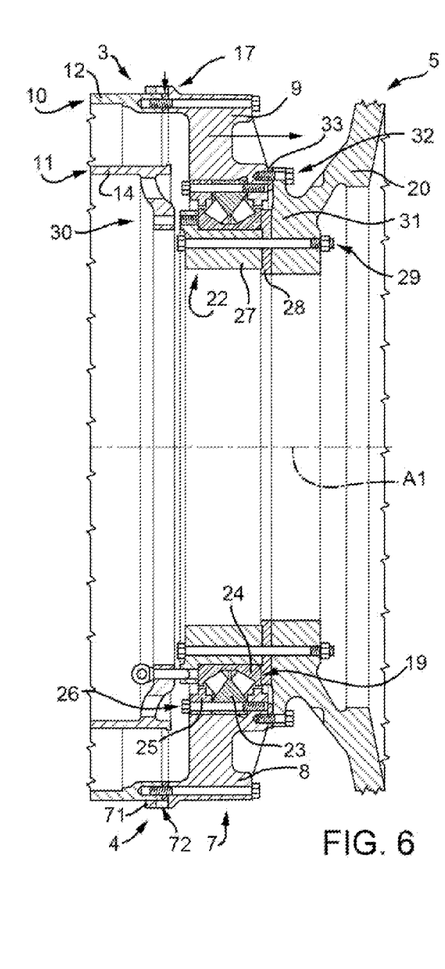
Figure 7:
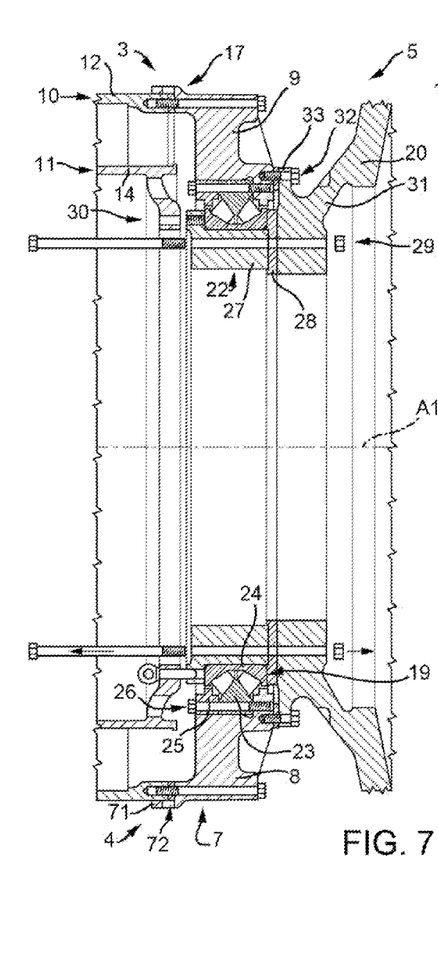
Figure 10:
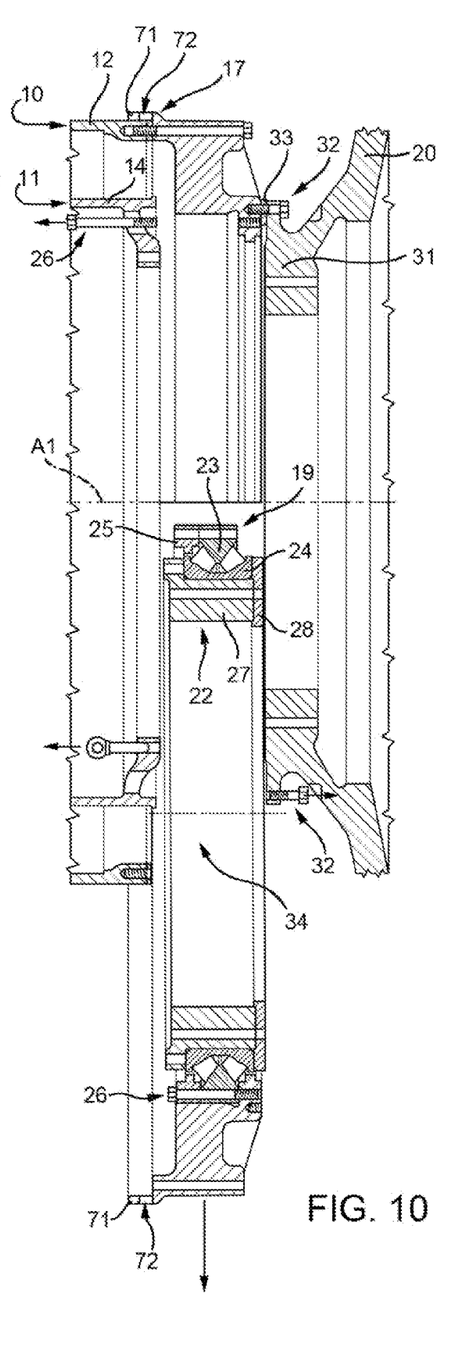

Removing bearing 19 substantially comprises: dismantling sector 8 from nacelle 3 to form an opening 34, at bearing 19, large enough to permit passage of bearing 19, as shown in FIG. 10; at least partly disconnecting bearing 19 from rotary assembly 5, as shown in FIGS. 5, 6 and 7; and removing sector 8, bearing 19 and connecting member 22 through opening 34 in nacelle 3.

The method of removing bearing 19 comprises fixing hub 20 to nacelle 3, as shown in FIG. 4, before disconnecting bearing 19 from rotary assembly 5 and removing sector 8.

In other words, connecting member 22 is disconnected from rotor 11 (FIG. 5) and hub 20 (FIG. 7). In one such embodiment, sector 8, bearing 19, and connecting member 22 are removed simultaneously from nacelle 3 and connected to one another, as shown in FIG. 10.

More specifically, the method of removing bearing 19 comprises a first step (FIG. 4) of fixing flange 31 of hub 20 to both sectors 8 and 9 using bolted joint 32 and shims 33 to lock rotary assembly 5 in a given position with respect to nacelle 3. Next, rotor 11 is locked in a given position with respect to stator 10 by inserting shims between rotor 11 and stator 10 in known manner (not shown in the drawings). In other words, rotor 11 is fixed to nacelle 3 independently of hub 20.

Next, rotor 11 is disconnected from rotary assembly 5 by removing the screws of bolted joint 30, as shown in FIG. 5.

With reference to FIG. 6, the screws of bolted joint 17 are loosened, and ring 7, bearing 19, hub 20, connecting member 22, and blades 21 are detached a few millimeters from the rest of nacelle 3—in the example shown, from wall 12—in a direction parallel to axis of rotation A1, to form a gap between rotor 11 and connecting member 22.

Shims (not shown in the drawings) are inserted through slots 72, and the screws of bolted joint 17 are retightened, so as to detach rotor 11 a few millimeters from connecting member 22.

With reference to FIG. 7, the bolts of bolted joint 29 are removed to disconnect connecting member 22 from hub 20.

Figure 8:
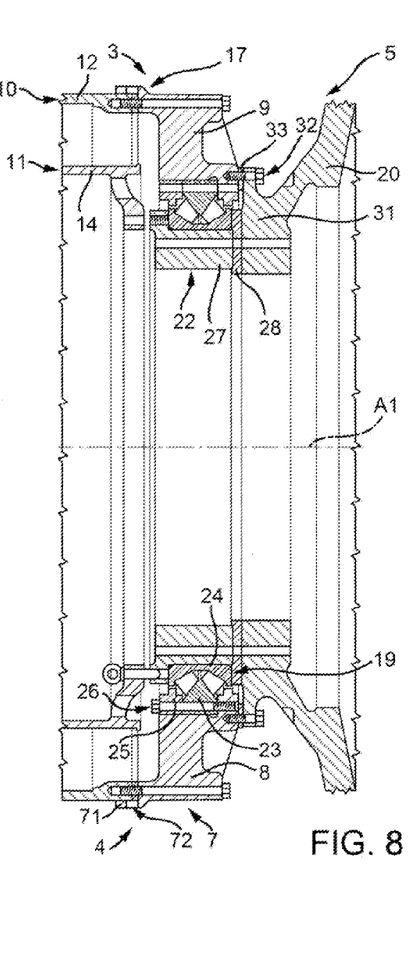

With reference to FIG. 8, one or more of the screws of bolted joint 26 are removed to release outer race 23 of bearing 19 from sector 9.

Figure 9:
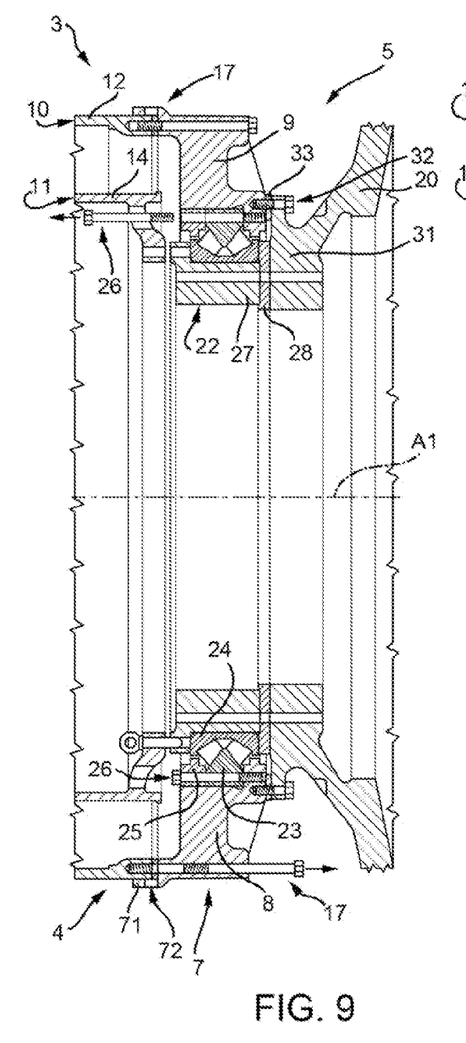

With reference to FIG. 9, one or more of the screws of bolted joint 17 are removed to release sector 8 from nacelle 3; and bolted joints 18 (FIG. 2) are also removed to release sector 8 from nacelle 3 and extract sector 8, bearing 19, connecting member 22, and flange 25 from nacelle 3.

The extraction operation may be performed using a crane or hoist (not shown in the drawings).

As will be clear from the above description, the only movement of bearing 19 is a radial movement with respect to axis of rotation A1.

The movements of the other component parts are also limited to only a few millimeters.

The new bearing is installed performing the bearing removal sequence in reverse.

In the above description, specific reference is made repeatedly, for the sake of simplicity, to bolted joints, which includes joints made using bolts and nuts, and/or screws screwed directly into one of the parts for connection. It should be appreciated that any other type of releasable joint may be employed as a bolted joint in accordance with the present disclosure.

As will be clear from the above description, the present disclosure has numerous advantages, such as providing a wind power turbine configured to permit easy bearing removal and installation, in particular to reduce downtime.

In alternative embodiments, the present disclosure applies to wind power turbines equipped with more than one bearing and other than tubular electric generators.

It should be appreciated that changes may be made to the wind power turbine and method as described herein without, however, departing from the scope of the accompanying Claims.

The invention is claimed as follows:

1. An electric energy producing wind power turbine comprising:
   a nacelle;
   an electric generator having a stator and a rotor;
   a rotary assembly connected to the nacelle and configured to rotate about an axis of rotation; and
   a bearing located between the nacelle and the rotary assembly;
   wherein the nacelle includes:
   (i) a first partially annular sector which, in use, extends about the bearing and is located adjacent to the bearing, the first partially annular sector is removable from a remainder of the nacelle, and the first partially annular sector is configured to form, when removed, an opening in the nacelle to allow passage of the bearing, and
   (ii) a second partially annular sector complementary to the first partially annular sector and connected to the first partially annular sector about the axis of rotation to form a ring configured to support the bearing.

2. The electric energy producing wind power turbine of claim 1, wherein the first partially annular sector extends along an at least 180° arc about the axis of rotation, and the first partially annular sector has a width, measured parallel to the axis of rotation, greater than a width, measured parallel to the axis of rotation, of the bearing.

3. The electric energy producing wind power turbine of claim 2, wherein the first partially annular sector at least partially supports the bearing.

4. The electric energy producing wind power turbine of claim 1, wherein the ring is connected to a remainder of the nacelle by a sliding coupling configured to slide a plurality of millimeters in a direction parallel to the axis of rotation to permit adjustments of the position of the ring with respect to the remainder of the nacelle.

5. The electric energy producing wind power turbine of claim 1, wherein the stator is a tubular stator and the first partially annular sector and the second partially annular sector are connected to the tubular stator to define a portion of the nacelle.

6. The electric energy producing wind power turbine of claim 5, wherein the stator comprises a cylindrical wall which is connected to the first partially annular sector and the second partially annular sector to define the portion of the nacelle.

7. The electric energy producing wind power turbine of claim 1, wherein the rotary assembly comprises the rotor, a hub, a plurality of blades extending from the hub, and a connecting member located, adjacent to the bearing, between the hub and the rotor.

8. The electric energy producing wind power turbine of claim 7, wherein the connecting member has a width, measured along the axis of rotation, smaller than a width, measured along the axis of rotation, of the first partially annular sector.

9. The electric energy producing wind power turbine of claim 7, wherein the connecting member comprises a ring, on which the bearing is mounted.

10. The electric energy producing wind power turbine of claim 7, wherein the rotor is a tubular rotor comprising a cylindrical wall connected to the connecting member.

11. The electric energy producing wind power turbine of claim 7, wherein the hub comprises a flange selectively connectable to the connecting member and the nacelle.

12. A method of removing a bearing from a wind power turbine including a nacelle, an electric generator having a stator and a rotor, a rotary assembly connected to the nacelle and configured to rotate about an axis of rotation, and a bearing located between the nacelle and the rotary assembly, said method comprising:
   removing, from a location adjacent to the bearing, a first partially annular sector of the nacelle from the nacelle to form an opening large enough to allow passage of the bearing, wherein prior to being removed, the first partially annular sector of the nacelle is connected about the axis of rotation to a second partially annular sector of the nacelle, said second partially annular sector of the nacelle being complementary to the first partially annular sector such that the first partially annular sector of the nacelle and the second partially annular sector of the nacelle form a ring configured to support the bearing;
   releasing the bearing at least partly from the rotary assembly; and
   removing the bearing through the formed opening in the nacelle.

13. The method of claim 12, wherein the rotary assembly comprises the rotor, a hub, and a plurality of blades extending from the hub and which includes fixing the hub to the nacelle before removing the first partially annular sector.

14. The method of claim 13, wherein the rotary assembly comprises a connecting member located, adjacent to the bearing, between the hub and the rotor, and which includes fixing the rotor to the nacelle, and releasing the connecting member from the rotor and the hub.

15. The method of claim 14, wherein the formed ring is connected to a remainder of the nacelle by a sliding coupling that slides in a direction parallel to the axis of rotation, and which includes moving the ring away from the remainder of the nacelle along the axis of rotation to form a gap between the rotor and the connecting member.

16. The method of claim 13, which includes removing the first partially annular sector, the bearing, and the connecting member simultaneously from the nacelle.

17. An electric energy producing wind power turbine comprising:
   a nacelle;
   an electric generator having a stator and a rotor;
   one bearing; and
   a rotary assembly connected to the nacelle by said bearing and configured to rotate about an axis of rotation;
   wherein:
   the nacelle includes first and second annular sectors complementary to each other and connected together to form a ring configured to support the bearing,
   said ring is displaceable in an axial direction with respect to a remainder of the nacelle, and
   the first annular sector is removable from the remainder of the nacelle.

18. An electric energy producing wind power turbine nacelle arrangement comprising:
   a cylindrical wall; and
   first and second annular sectors complementary to each other and connected together to: (i) form a ring configured to support one rotary assembly bearing, and (ii) extend about an axis;

wherein:
the ring is connected to the cylindrical wall and displaceable in an axial direction with respect to the cylindrical wall, and
the first annular sector is removable from the cylindrical wall and the second annular ring in a radial direction to form, when removed, an opening to allow passage of the bearing.

* * * * *